United States Patent
Bettesworth et al.

(10) Patent No.: US 9,924,013 B2
(45) Date of Patent: Mar. 20, 2018

(54) AUTOMATIC COMMUNICATION RESPONSES

(71) Applicant: International Business Machines Corporation, Armonk, NY (US)

(72) Inventors: Gary S. Bettesworth, Basingstoke (GB); James Hewitt, Eastleigh (GB); Andreas Martens, Fair Oak (GB); Paul Thorpe, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/152,687

(22) Filed: May 12, 2016

(65) Prior Publication Data

US 2017/0331935 A1 Nov. 16, 2017

(51) Int. Cl.
*H04M 3/42* (2006.01)
*H04M 1/663* (2006.01)
*H04M 3/22* (2006.01)

(52) U.S. Cl.
CPC ......... *H04M 1/663* (2013.01); *H04M 3/2218* (2013.01); *H04M 3/42059* (2013.01)

(58) Field of Classification Search
CPC ........................... H04M 3/56; H04M 3/42195
USPC ......... 455/518, 458, 414.1, 426.1, 415, 413, 455/417, 550.1; 379/352, 219, 115.03, 379/142.01, 88.22
See application file for complete search history.

(56) References Cited

U.S. PATENT DOCUMENTS

| | | |
|---|---|---|
| 7,010,288 B2 | 3/2006 | Brown et al. |
| 8,565,731 B2 | 10/2013 | Lynch |
| 8,897,811 B2 | 11/2014 | Filev |

(Continued)

FOREIGN PATENT DOCUMENTS

| | | |
|---|---|---|
| CN | 201197164 Y | 2/2009 |
| CN | 101753681 A | 6/2010 |

OTHER PUBLICATIONS

Sameed Khan, Auto Reply to Text Messages & Incoming Calls on Your Android Phone, Mar. 1, 2011, 4 pages.

(Continued)

*Primary Examiner* — Kiet Doan
(74) *Attorney, Agent, or Firm* — Schmeiser, Olsen & Watts, LLP; Scott Dobson (57) ABSTRACT

A method, and associated system, for determining an automatic action to be performed in response to an unsuccessful communication request. A first set of data, obtained from a first electronic communication device, is transmitted by the first electronic communication device to the computing system in response to a determination by the first electronic communication device that a called user of the first electronic communication device is unable or unwilling to accept a communication request from a calling user of a second electronic communication device. The first set of data is associated with the called user, the first electronic communication device, the second electronic communication device, or combinations thereof. A second set of data is obtained from the second electronic communication device and associated with the calling user, the second electronic communication device, or both. The action to be performed is determined based on the first and second sets of data.

17 Claims, 6 Drawing Sheets

(56) References Cited

U.S. PATENT DOCUMENTS

| | | | |
|---|---|---|---|
| 8,897,822 B2 | 11/2014 | Martin | |
| 2004/0203794 A1 | 10/2004 | Brown et al. | |
| 2009/0077244 A1* | 3/2009 | Trang | H04M 3/42195 |
| | | | 709/228 |
| 2010/0158220 A1* | 6/2010 | Silverman | H04M 3/42195 |
| | | | 379/88.22 |
| 2010/0330974 A1 | 12/2010 | Balannik et al. | |
| 2012/0315880 A1 | 12/2012 | Peitrow et al. | |

OTHER PUBLICATIONS

Neil Gonzalez, Auto-Reply to Missed Calls & Texts on Android When You're Busy, 4 pages (no date).

\* cited by examiner

AUTOMATIC COMMUNICATION RESPONSES

TECHNICAL FIELD

The present invention relates to the field of automatically responding communication devices.

BACKGROUND

Typically, when a communication request from a calling electronic communication device to another (i.e., called) communication device has been unsuccessful, the called communication device sends an automatic message to the calling communication device. Such known communication devices include cell phones, laptops, computers and the like It is also known for the user of the called communication device to interact with the called communication device so as to select a message to return to the calling communication device.

SUMMARY

An embodiment of the present invention provides a method, and associated computing system and computer program product, for determining an automatic action to be performed in response to an unsuccessful communication request. One or more processors of the computing system obtain, from a first electronic communication device, a first set of data transmitted by the first electronic communication device to the computing system in response to a determination by the first electronic communication device that a called user of the first electronic communication device is unable or unwilling to accept a communication request from a calling user of a second electronic communication device. The first set of data is associated with the called user, the first electronic communication device, the second electronic communication device, or combinations thereof. The first and second electronic communication devices are different electronic communication devices and are both external to the computing system. The one or more processors obtain, from the second electronic communication device, a second set of data associated with the calling user, the second electronic communication device, or a combination thereof. The one or more processors determine the action to be performed based on the first set of data and the second set of data.

BRIEF DESCRIPTION OF THE DRAWINGS

Embodiments of the present invention will now be described, by way of example only, with reference to the following drawings.

DETAILED DESCRIPTION

It should be understood that the Figures are merely schematic and are not drawn to scale. It should also be understood that the same reference numerals are used throughout the Figures to indicate the same or similar parts.

A computer-implemented method determines an automatic action to be performed in response to an unsuccessful communication request. The method comprises determining a called user of a first electronic communication device is unable or unwilling to accept a communication request from a calling user of a second electronic communication device. The method also comprises, at a different device from the first electronic communication device: obtaining, from the first electronic communication device, a first set of data associated with at least one of: the called user; the first electronic communication device; and the second electronic communication device; obtaining, from the second electronic communication device, a second set of data associated with at least one of the calling user and the second electronic communication device; and determining an automatic action to be performed based on the first set of data and the second set of data.

A computer program product of the present invention determines an automatic action to be performed in response to an unsuccessful communication request, the computer program product comprising a computer readable storage medium having program instructions embodied therewith, the program instructions executable by a computing system to cause the computing system: to determine a called user of a first electronic communication device is unable or unwilling to accept a communication request from a calling user of a second electronic communication device; obtain, from the first electronic communication device, a first set of data associated with at least one of: the called user; the first electronic communication device and the second electronic communication device; obtain, from the second electronic communication device, a second set of data associated with at least one of the calling user and the second electronic communication device; and determine, at a different device from the first electronic communication device, an automatic action to be performed based on the first set of data and the second set of data.

A computing system of the present invention determines an automatic action to be performed in response to an unsuccessful communication request, the computing system being adapted to: determine a called user of a first electronic communication device is unable or unwilling to accept a communication request from a calling user of a second electronic communication device; obtain, from the first electronic communication device, a first set of data associated with at least one of: the called user; the first electronic communication device and the second electronic communication device; obtain, from the second electronic communication device, a second set of data associated with at least one of the calling user and the second electronic communication device; and determine, at a different device from the first electronic communication device, an automatic action to be performed based on the first set of data and the second set of data.

Figure 1:
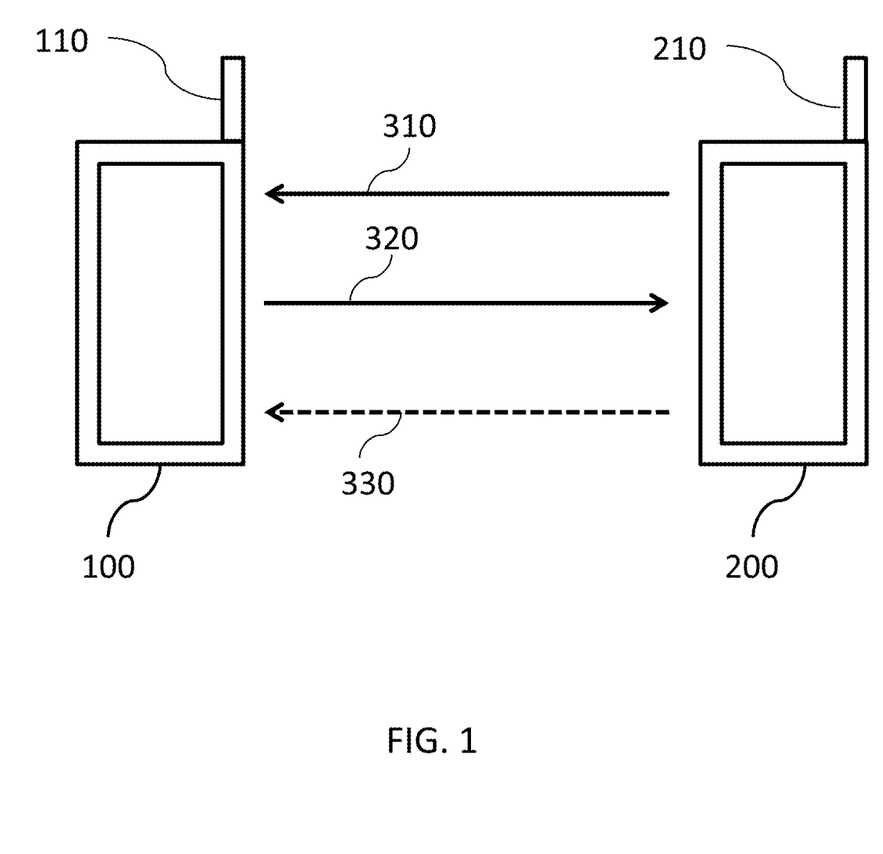
FIG. 1. illustrates a computing system, according to first embodiments of the present invention.

FIG. 1 illustrates a computing system (or computer system), according to first embodiments of the present invention. The computing system in FIG. 1 may comprise a first electronic communication device 100 and a second electronic communication device 200. Each electronic communication device 100, 200 is adapted to communicate with the other by, for example, a respective communication arrangement (such as a transceiver module).

In other words, the first electronic communication device 100 may receive a communication request 310 from the second electronic communication device 200.

A called user of the first electronic communication device 100 may be unable or unwilling to accept the communication request 310, such that the communication request 310 is ignored, rejected, unnoticed, disregarded or otherwise not accepted. By way of example, the first electronic communication device 100 may automatically reject the communication request 310 after a predetermined period of time if the called user of the first electronic communication device 100 has not otherwise acknowledged or accepted the communication request 310. In other words, the first electronic communication device 100 and/or the second electronic communication device 200 may be adapted to determine when the called user of the first electronic communication device 100 is unable or unwilling to accept the communication request 310 such that the communication request 310 is unsuccessful.

In response to the communication request 310 being unsuccessful, the second electronic communication device 200 obtains from the first electronic communication device 100 information associated with the first electronic communication device 100 and/or the called user. That is to say, the first electronic communication device 100 may communicate information or data comprising information about the first electronic communication device 100 and/or the called user to the second electronic communication device 200. This obtained/communicated information may be considered to be a first set of data 320. The called user of the first electronic communication device 100 may, for example, be a current user of the first electronic communication device or a default user associated with the first communication device 100.

In some embodiments, the first electronic communication device 100 may determine what information is included in the first set of data based on information received from the second electronic communication device 200; for example, identifying information of the second electronic communication device 200 (e.g., a caller ID). In other words, the first electronic communication device 100 may be adapted to only provide particular information to the second electronic communication device 100, the selection of such information being based on identifying information of the second electronic communication device 200. The second electronic communication device 200 may pass such identifying information to the first electronic communication device 100 in the communication request 310.

The second electronic communication device 200 may be adapted to also obtain information (e.g., from the second electronic communication device 200) associated with the calling user, the second electronic communication device 200 or both. That is to say, the second electronic communication device 200 may obtain (e.g., from the second electronic communication device 200) a second set of data comprising information associated with the calling user and/or the second electronic communication device 200.

The second electronic communication device 200 may then be adapted to determine an automatic action to be performed based on the first set of data and the second set of data. In other words, the second electronic communication device 200 identifies an action to be executed based on both information associated with the first electronic communication device/called user (received or obtained from the first electronic communication device 100) and information associated with the second electronic communication device/calling user (received or obtained from the second electronic communication device 200).

In one embodiment, upon determining an automatic action to be performed, the second electronic communication device 200 may pass instructional information 330 to the first electronic communication device 100, the instructional information comprising information about the action to be performed. In one embodiment, the first electronic communication device 100 may automatically perform an action based on this instructional information.

In other or further embodiments, the second electronic communication device 200 may carry out (e.g., perform or execute) the automatic action. In some embodiments, both the first electronic communication device 100 and the second electronic communication device 200 may carry out a respective automatic action.

For explanatory purposes only, in one possible scenario the first set of data 320 (from the first electronic communication device 100) may comprise location information of the called user, and the second set of data (from the second electronic communication device 200) may comprise location information of the calling user. The second electronic communication device 200 may then determine, based on the first set of data and the second set of data, whether the called user and the calling user are near to each other, and if so then automatically determine to direct the calling user towards the called user (using mapping software, for example).

Alternatively, or additionally, the second electronic communication device 200 may be adapted to determine an intended purpose of the calling user (e.g., a reason behind the communication request 310) based on the first set of data and the second set of data. The automatic action may then be determined based on the determined intended purpose of the calling user.

Determining the intended purpose of the calling user may comprise predicting a most probable intended purpose of the calling user. In other words, the second electronic communication device 200 may predict, based on the first set of data 320 and the second set of data, a most probable intended purpose of the calling user, and determine the most probable intended purpose as being the intended purpose of the calling user.

In some embodiments, the first set of data 320 and the second set of data may be made available to a known "virtual assistant", also known as an intelligent personal assistant, a knowledge navigator or a question answering system. A user of the second electronic communication device 200 may, in embodiments, interact with such a virtual assistant so as to determine an automatic action to be taken.

The present invention allows for an automatic action to be determined based on information received from the first 100 and second 200 electronic communication devices, which (i) may advantageously allow for actions to be automatically determined and performed without requiring any input of the called user (i.e., the user of the first electronic communication device 100), and (ii) could provide an improved efficiency with respect to the called and calling user, reducing an amount of wasted time (e.g., checking messages or reattempting to establish communication between the first 100 and second 200 electronic communication devices). The present invention may also allow for automatic actions to be determined with a minimal power being used by the called device 100 (i.e., the electronic communication device 100 is the called device because the electronic communication device 100 is used by the called user), enabling automatic actions to be performed while maintaining a suitable power efficiency of the called device (as the action to be performed is determined externally to the called device).

Figure 2:
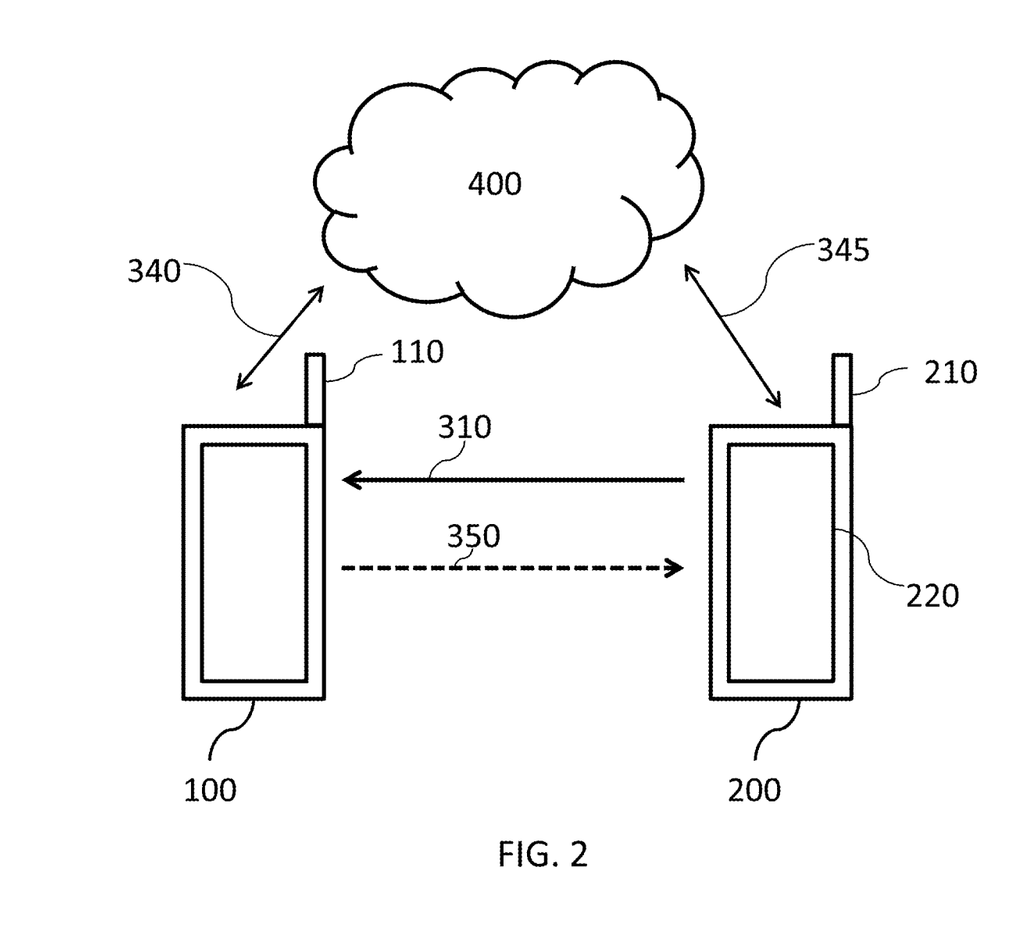
FIG. 2 illustrates a computing system, according to second embodiments of the present invention.

FIG. 2 illustrates a computing system (or computer system), according to second embodiments of the present invention. The computing system in FIG. 2 may comprise a first electronic communication device 100, a second electronic communication device 200 and a cloud computing network 400. Each electronic communication device 100, 200 is adapted to communicate with the other by, for example, a respective communication component 110, 210 (such as a transmitter/receiver module or antenna). The cloud computing network 400 may otherwise be understood to be a cloud computing system, a cloud computing service or a cloud computing environment.

In other words, the first electronic communication device 100 may receive a communication request 310 from the second electronic communication device 200.

A user of the first electronic communication device 100 may be unable or unwilling to accept the communication request 310, such that the communication request 310 is ignored, rejected, or otherwise not accepted. By way of example, the first electronic communication device 100 may automatically reject the communication request 310 after a predetermined period of time if the user of the first electronic communication device has not otherwise acknowledged or accepted the communication request 310 within the predetermined period of time. In other words, at least one of the first electronic communication device 100 and the second electronic communication device 200 is adapted to determine when a communication request 310 is unsuccessful.

In response to the communication request 310 not being accepted, a first set of data 340, comprising information associated with the called user or the first electronic communication device 100, may be obtained by the cloud computing network 400 from the first electronic communication device 100. In other words, the first electronic communication device 100 may pass information associated with the called user and/or the first electronic communication device 100 to the cloud computing network 400.

In some embodiments, the first electronic communication device 100 may determine what information is included in the first set of data 340 based on information related to the second electronic communication device 200, for example, identifying information of the second electronic communication device (for example, a caller ID). In other words, the cloud computing network may select what data to obtain from the first electronic communication device 100 based on identifying information of the second electronic communication device 200.

In an embodiment, the cloud computing network 400 is further adapted to receive a second set of data 345, comprising information associated with the calling user and/or the second electronic communication device 200, from the second electronic communication device 200. The cloud computing network 400 may be adapted to determine an automatic action to be performed based on the first set of data 340 and the second set of data 345.

In another embodiment, the cloud computing network 400 passes the first set of data 340 obtained from the first electronic communication device 100 to the second electronic communication device 200. The second electronic communication device may, based on the received first set of data 340 (received via the cloud computing system 400) and the second set of data 345 obtained from the second electronic communication device 200, determine an automatic action to be performed. In some embodiments, the cloud computing service 340 may only provide a limited amount or a selection of the first set of data 340 to the second electronic communication device 200, which may be based on identifying information of the second electronic communication device 200 and/or the second set of data 345.

In yet another embodiment, the cloud computing network 400 may be adapted to receive the second set of data from the second electronic communication device 200 and determine an intended purpose of the calling user (i.e., the reason why the second electronic communication device 200 attempted to communicate with the first electronic communication device 100). In some embodiments, the cloud computing network 400 may determine an automatic action to be performed based on the determined intended purpose of the calling user. In other or further embodiments, the cloud computing system 400 may pass information indicating the determined intended purpose of the calling user to the second electronic communication device 200, where the second electronic communication device 200 determines an automatic action to be performed based on the determined intended purpose of the calling user.

It will be apparent from the above described embodiments that the obtaining of the first set of data 340, the obtaining of the second set of data 345 and the determining of the automatic action to be performed may be carried out by any combination of the cloud computing system 400 and the second electronic communication device 200. Similarly, the determining of an intended purpose of the calling user may be performed by either one of the cloud computing system 400 and the second electronic communication device 200.

Use of the cloud computing network 400 to perform such actions may provide the advantages of ensuring an increased privacy to the users (as potentially unnecessary and private information need not be passed between the electronic communication devices 100 and 200), an increased security (as data of the first device may not be passed to the second electronic communication device 200), and an improved efficiency as, for example, only necessary information may be obtained from the first 100 and/or second 200 electronic communication devices. The cloud computing network 400 may also offer a greater amount of processing power over, for example, the second electronic communication device 200 so as to more intelligently determine an automatic action to be performed.

Furthermore, use of a cloud computing network 400 to perform such actions may also be advantageous if a connection between the first electronic communication device 100 and the second electronic communication device 200 or signal strength of the first 100 and second 200 communication devices is poor, as the cloud computing system 400 may, for example, store the determined automatic action until connection or signal strength is reestablished.

The cloud computing system 400 may be adapted to retrieve information from at least one of the first electronic communication device 100 or the second electronic communication device 200 based on one of the first set of data 340 and the second set of data 345. By way of example, if the first set of data 340 comprises only calendar information, the cloud computing system 400 may be adapted to obtain identifying information from the second electronic communication device 200, such that the second set of data 345 comprises only the identifying information.

In other words, the cloud computing system 400 may selectively obtain information from at least one of the electronic communication devices 100 and 2090. This provides an increased efficiency, as unnecessary data or information need not be passed, as well as an improved security.

In embodiments, the first electronic communication device 100 may provide an indication 350 to the second electronic communication device 200 that the communication request 310 has been unsuccessful. In some embodiments, the second electronic communication device 200 may pass the second set of data 345 to the cloud computing network 400 in response to the indication 350 that the communication request has been unsuccessful.

In some other or further embodiments, the second electronic communication device 200 may be adapted to receive response information input by a user in response to the indication that a communication request has been unsuccessful. The second set of data 345 (for example, passed to the cloud computing system 400) may comprise such response information.

By way of example, upon receiving the indication that the communication request 310 has been unsuccessful, the calling user may input response information into the second electronic communication device 200. Such response information may comprise a voice instruction (e.g. an audio signal), a selection from a predetermined list of responses, a picture, text data and so on. The response information may be input by a user via an input interface 220 (comprising, for example, a keyboard, a touch-screen interface, a microphone, a camera and the like) of the second electronic communication device 200. Other possible input interfaces would be readily apparent to the person skilled in the art.

In some examples, the response information may be passed to the cloud computing system 400 for interpretation or further processing (e.g., performing voice recognition of an audio signal or image recognition of an image) before being returned to the second electronic communication device 200. In other words, the cloud computing system 400 may be adapted to obtain the second set of data 345 from the second electronic communication device 200, perform further processing on the second set of data 345, and communicate the processed second set of data 345 to the second electronic communication device 200. In other embodiments, the cloud computing system 400 may be adapted to perform such further processing on the second set of data 345 and consider the processed second set of data 345 together with the first set of data 340 (received from the first electronic communication device 100) so as to determine an automatic action to be performed.

In some embodiments, the calling user may interact with the cloud computing system 400 (e.g. via the input interface 220 of the second communication device 200) so as to establish further information before determining the automatic action. In one example, based on the first set of data 340 and the second set of data 345, the cloud computing service 400 may present a number of options to the calling user. The user may indicate at least one of these options so as to enable the cloud computing service 340 to determine an automatic action to take.

In other or further embodiments, the cloud computing system 400 may comprise a "virtual assistant" software, with which the user of the second electronic communication device 200 can interact and to which the first set of data 340 and the second set of data 345 is made available, where the virtual assistant software determines the automatic action to be taken.

In at least one embodiment, if no automatic action can be determined (e.g., due to insufficient information from the first set of data 340 and/or the second set of data 345) the cloud computing system 400 will redirect the calling user to a system adapted to store a record of the calling user. Such a system may comprise, for example, a voicemail, videomail or answer machine service. In other or further embodiments, the determined automatic action may be include forwarding the user o such a system adapted to store a record of the calling user. In embodiments, the default automatic action may include forwarding the user to such a system adapted to store a record, where the automatic action may be changed based on the first set of data 340 and the second set of data 345. In at least one embodiment, if an intended purpose is to be predicted, and no intended purpose can be predicted with a sufficiently high degree of probability (e.g., relative to a specified threshold), the calling user may be redirected as above described.

The the first set of data 340 obtained from the first electronic communication device may comprise at least one of: identifying information of the called user or the first electronic communication device 100; calendar information of the called user; location information of the called user; location information of the first electronic communication device 100; a battery level of the first electronic communication device 100; a local time of the first electronic communication device 100; an active application of the first electronic communication device 100; a phone state of the first electronic communication device 100; scheduling information of the called user; weather in the vicinity of the called user or the first electronic communication device 100; traffic information in the vicinity of the called user or the first electronic communication device 100; a proximity of the called user to the calling user; contact information of the called user (e.g. numbers, addresses, contact lists, friend graphs and so on); contact information stored by the first electronic communication device 100; and so on.

Similarly, the second set of data 345 obtained from the second electronic communication device 200 may comprise at least one of: identifying data of the calling user or the second electronic communication device 200; calendar information of the calling user; location information of the calling user; location information of the second electronic communication device 200; a phone state of the second electronic communication device 200; a battery level of the second electronic communication device 200; a local time of the second electronic communication device 200; an active application of the second electronic communication device 200; scheduling information of the calling user; weather in the vicinity of the calling user or the second electronic communication device 200; traffic information in the vicinity of the calling user or the second electronic communication device 200; an intention of the calling user; a proximity of the calling user to the called user; contact information of the calling user (e.g., numbers, addresses, contact lists, friend graphs and so on); contact information stored by the second electronic communication device 200; and so on.

In particular embodiments, the first set of data 340 obtained from the first electronic communication device 100 may, for example, further comprise a caller ID of the calling user or other information pertaining to the second communication device 200.

Other possible information or parameters associable with the called user, the calling user, the first electronic communication device 100 and/or the second electronic communication device 200 will be readily apparent o the skilled person such that the above lists are considered to be non-exhaustive.

In some embodiments, the determining of the automatic action to be performed may be further based on at least one of: environmental considerations; a time; weather conditions; traffic conditions; news information; pollution levels; hazard alerts; environmental warnings; pollen count levels; wind levels; and public transport information. In other words, the determining of the automatic action may be further based on external factors (to the first 100 and/or second 200 electronic communication device).

By way of example, in at least one conceivable embodiment, the first set of data 340 (obtained from the first electronic communication device 100) comprises calendar or scheduling information of the called user, and the second set of data 345 comprises identifying information of the calling user. The determined automatic action may be one of changing or altering the calendar or scheduling information of the called user based on the identifying information of the calling user. In some further embodiments, the determining of the automatic action may be based on a current time. This may allow, for example, for a meeting between the calling user and the called user to be automatically rescheduled if (for example) it is determined that the called user and the calling user ought to be in a meeting (based on a comparison between the calendar/scheduling information, the identifying information and a current time and thus the automatic action may be to reschedule the meeting.

Put another way, with reference to the above described embodiments, a calling user may use the second electronic communication device 200 to call the first electronic communication device 100 in an attempt to contact the called user so as to begin a communication. The called user may be unable or unwilling to communicate with the calling user, and may reject, ignore or otherwise not accept the call, in response to which, the first electronic communication device may pass or communicate information (about the calling user or the first electronic communication device 100) to another, external or different device. The another, external or different device also obtains information from the second electronic communication device 200. Based on the obtained information from the first electronic communication device 100 and the second electronic communication device 200, the another, external or different device may determine an automatic action to be performed.

In embodiments, the another, external or different device may be understood to comprise the second electronic communication device 200, such that the second electronic communication device 200 receives information related to the called user or the first electronic communication device 100 from the first electronic communication device 100. In other words, the external device and the second electronic communication device 200 may be a same electronic communication device.

In other or further embodiments, the another, external or different device may be understood to comprise a distributed processing resource or cloud computing network, such that the distributed processing resource or cloud computing network may perform at least one of obtaining the first set of data 340 from the first electronic communication device 100; obtaining the second set of data 345 from the second electronic communication device 200; and determining an automatic action to be performed based on the first set of data 340 and the second set of data 345. For example, in some embodiments, the cloud computing network 400 may obtain the first set of data 340 from the first electronic communication device 100 and pass the first set of data 340 to the second electronic communication device 200, such that the second electronic communication device 200 may perform the determining of the automatic action to be performed.

It will be apparent that the another, external or different device is not limited to only one of the second electronic communication device 200 and/or a cloud computing network 400, but may rather consist of any device capable of performing the obtaining the first set of data 340 and the second set of data and the determining of the automatic action. Such a device may, for example, comprise a computer, a remotely-located server, or a further electronic communication device.

In embodiments, the information or second set of data 345 obtained from the second electronic communication device 200 is not passed via the first electronic communication device 100, such that the first electronic communication 100 does not transfer information or data associated with the calling user or the second electronic communication device 200 to the another, external or different device.

By way of further explanation, it could be understood that in response to a failed or unsuccessful communication request between the first 100 and second 200 electronic communication device, a corpus of data is assembled comprising data obtained from both the respective first 100 and second 200 electronic communication devices. An automatic action (to be performed) is determined based on this assembled corpus of data. In embodiments, the assembled corpus of data is made available to an intelligent personal or virtual assistant service, such that a calling user (being the user who attempted to initiate the communication request 310) is able to interact with the virtual assistant service so as to determine the automatic action to be performed. It should be understood that it may be preferable for the corpus of data to be assembled externally to the called communication device (being that device with which the communication request was requested).

The skilled person will readily understand that the respective electronic communication devices and/or the cloud computing system 400 may communicate over any one or more communication channels whether wired or wireless, for example, over a cellular or mobile network, over the internet, via Bluetooth®, via radio signals, via a wire and so on. Each electronic communication device may, in various embodiments, comprise at least one of: a mobile phone, a computer system, a personal computer, a two-way radio, a handheld transceiver; an automobile computer system, a laptop and so on. It will be clear to the skilled person that the communication channel over which the communication request, the first set of data 340 and/or the second set of data 345 is communicated may be different or the same. By way of example, the communication request 310 may be communicated over a cellular or mobile network, whereas the first set of data 340 may be passed to the external device via a Win antenna.

References to a communication request may include a request to commence a call (e.g., a video call or phone call), a request to begin transfer of data, a transfer of textual data (e.g., an SMS or an email) and so on. Other such communication requests will be readily apparent to the person skilled in the art.

One possible scenario in which the above described system may be used shall now be described, for the purposes of further explanation. Person A and Person B may have scheduled a meeting for a particular time. Person B may be running late, and attempts to call the first electronic communication device 100 (operated by Person A) using the second electronic communication device 200. In the scenario that Person A is unable to take the call; the first communication device 100 may make scheduling information of Person A available to a cloud computing system 400.

Similarly, the second electronic communication device 200 may make identifying information of Person B available to the cloud computing system 400. The cloud. computing system 400 may compare the scheduling information of Person A to the identifying information of Person B, and determine that Person B should be meeting Person A. The cloud computing system 400 may then ask or request whether Person B would like to reschedule the meeting and, upon receiving confirmation from Person B, determine an automatic action (of rescheduling the meeting) to be performed by the first electronic communication device 100. The cloud computing system 400 may correspondingly instruct the first electronic communication device 100 to carry out the automatic action and thereby reschedule the meeting.

Figure 3:
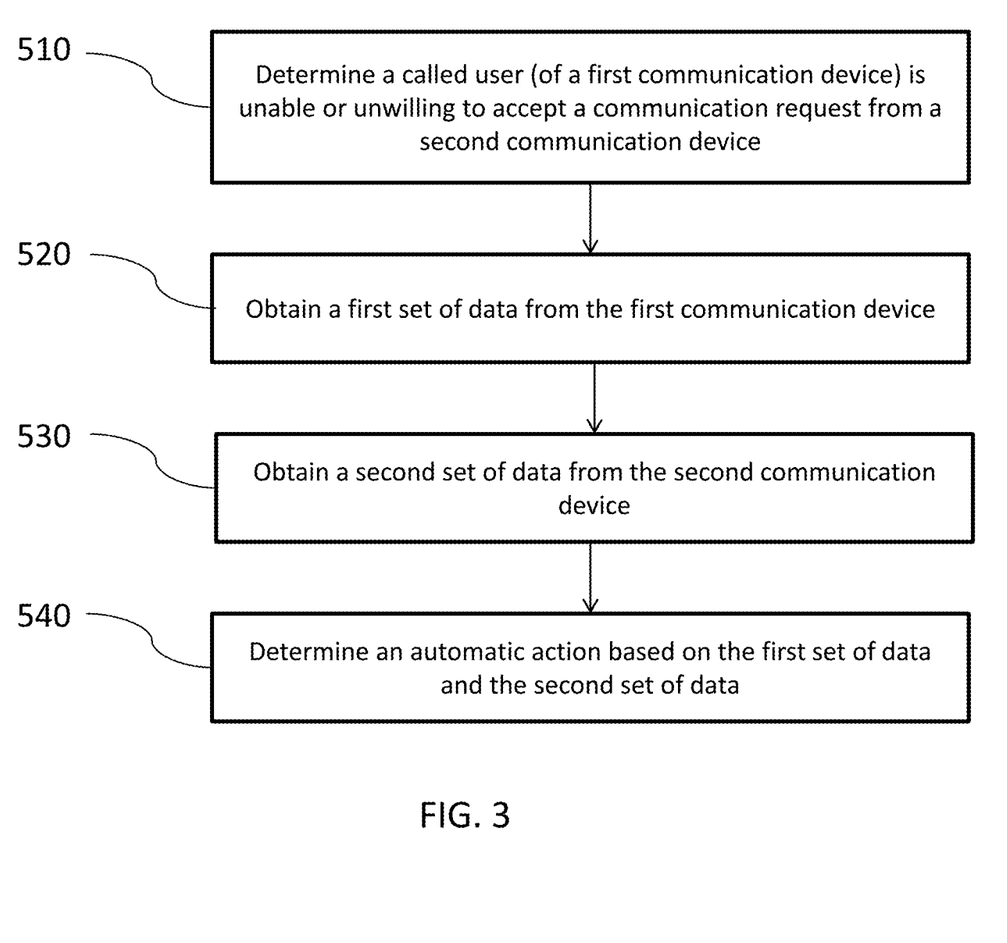
FIG. 3 illustrates a flow diagram of a method of determining an automatic action to be performed, according to embodiments of the present invention.

FIG. 3 illustrates a flow diagram of a method of determining an automatic action to be performed, according to embodiments of the present invention. In step 510, a called user of the first electronic communication device 100 is unable or unwilling to accept a communication request from a calling user of the second electronic communication device 200. The method further comprises, by a different device from the first electronic communication device 100: obtaining in step 520, from the first electronic communication device 100, a first set of data 340 associated with at least one of: the called user; the first electronic communication device 100 and the second electronic communication device 200; obtaining in step 530, from the second electronic communication device 200, a second set of data 345 associated with at least one of the calling user and the second electronic communication device 200; and determining in step 540 an automatic action to be performed based on the first set of data 340 and the second set of data 345.

As will be apparent from the above description, the obtaining of the first set of data 340 the obtaining of the second set of data 345 and/or the determining of the automatic action is optionally performed by at least one of a cloud-computing system 400 and the second electronic communication device 200.

With reference to the following description made with regard to a cloud computing system 400, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud model are as follows:

On-demand self-service: a cloud consumer can unilaterally provide computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models of the cloud model are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models of the cloud model are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
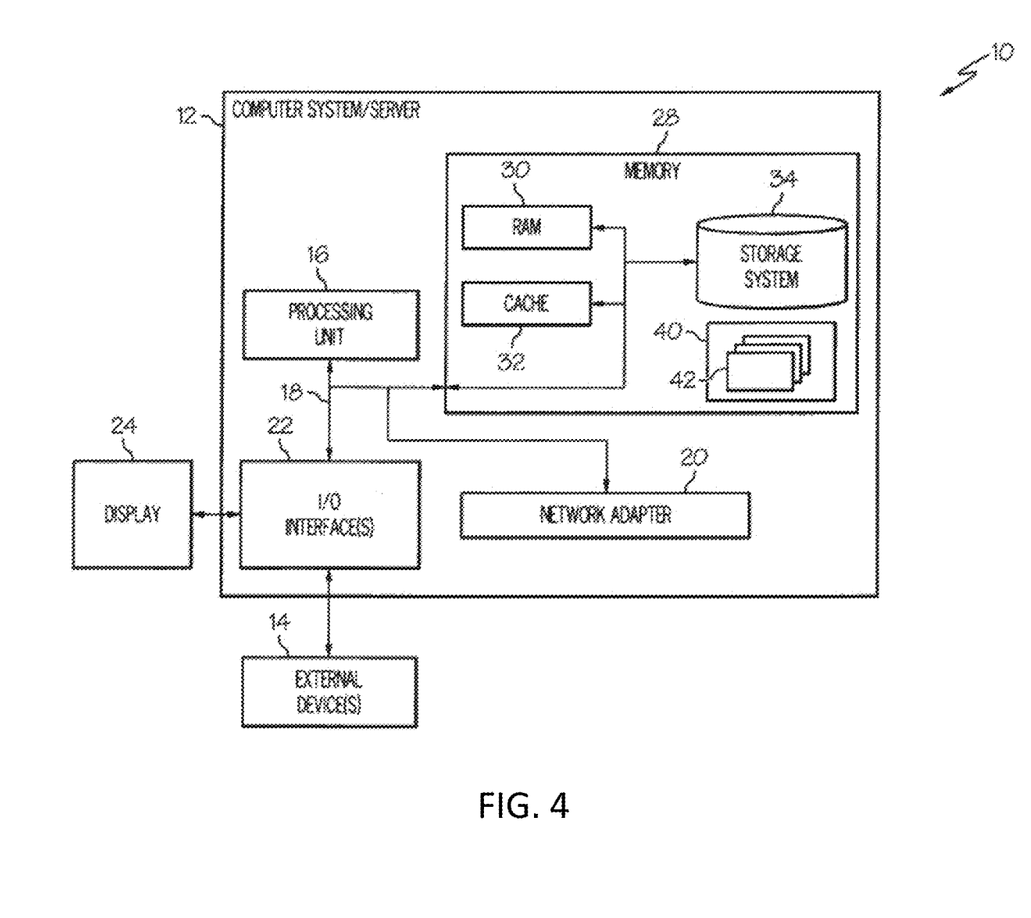
FIG. 4 illustrates a cloud system node, according to embodiments of the present invention.

FIG. 4 illustrates a cloud system node 10, according to embodiments of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations such as the cloud computing system 400, the first electronic communication device 100, and the second electronic communication device 200. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drive redundant processing units, external disk drive arrays, RAID systems, tape drives, and data archival storage systems, etc.

Figure 5:
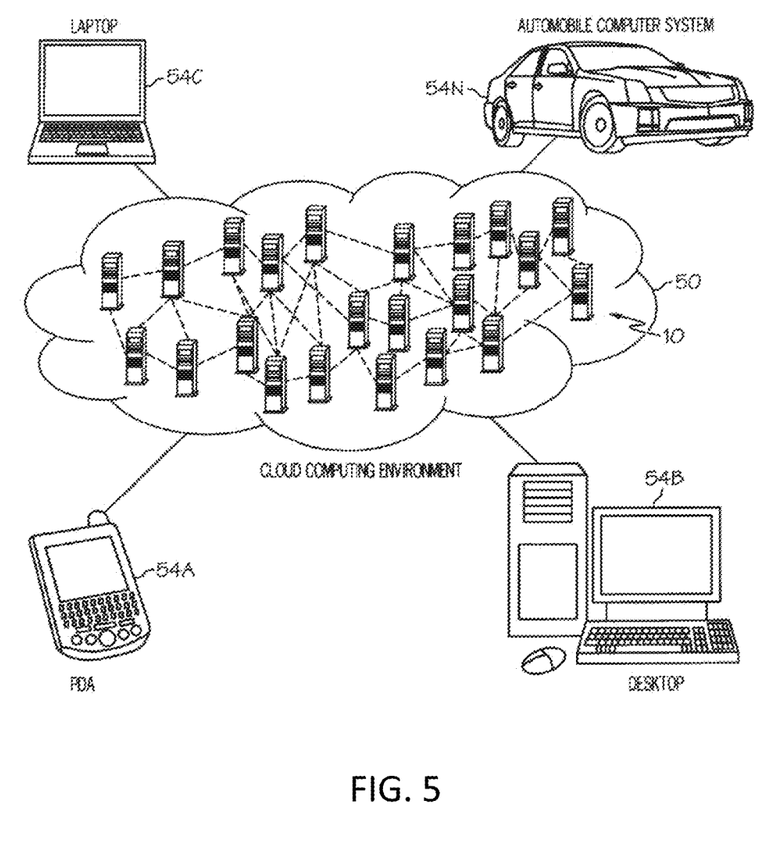
FIG. 5 illustrates a cloud computing environment or cloud computing system, according to embodiments of the present invention.

FIG. 5 illustrates a cloud computing environment or cloud computing system 50, according to embodiments of the present invention. The cloud computing environment or cloud computing system 50 can, in embodiments, be equated to the cloud computing system 400 as depicted in FIG. 2. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes 10 may be grouped (not shown) physically or virtually, in one or more networks, such as Private, Community, Public, or Hybrid clouds as described hereinabove, or a combination thereof, which allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
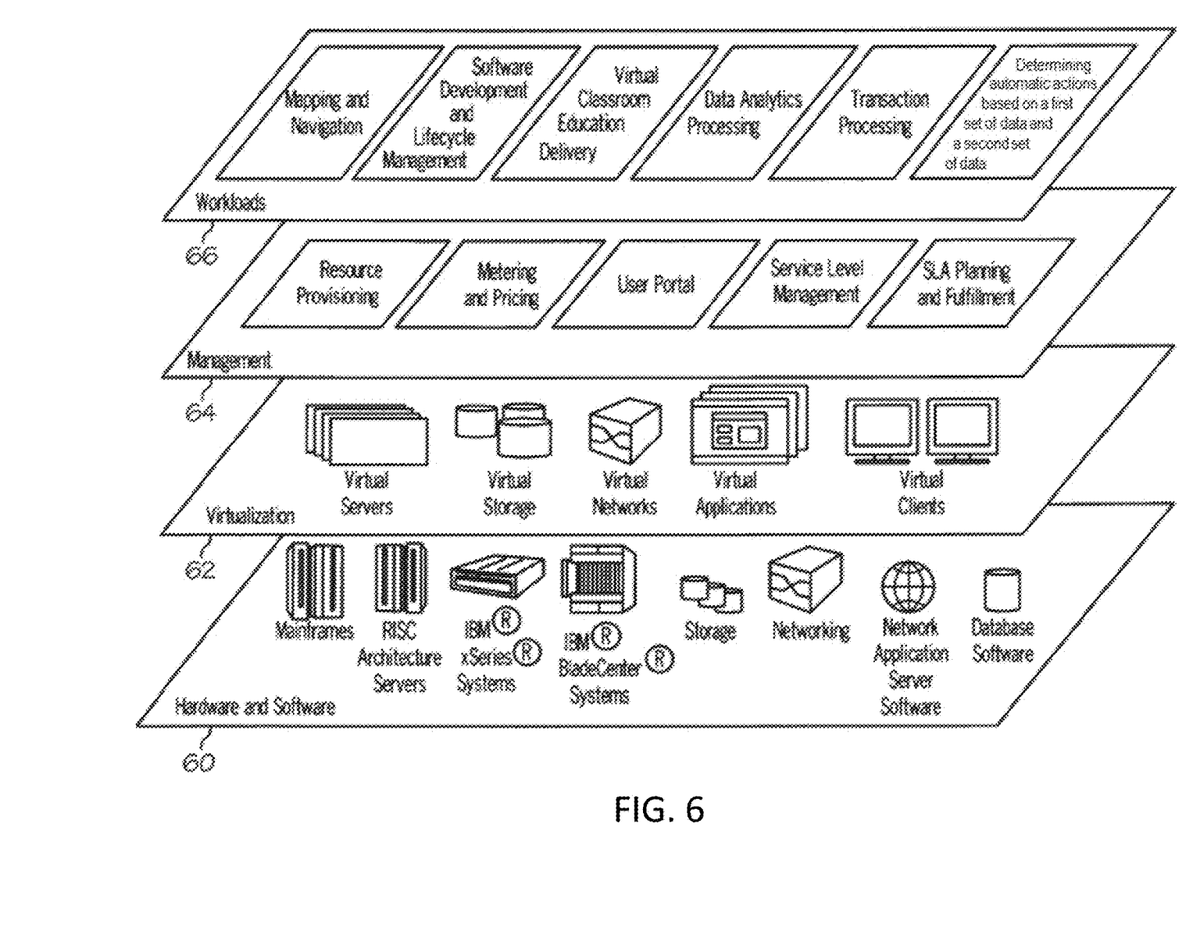
FIG. 6 illustrates cloud abstraction mode layers, according to embodiments of the present invention.

FIG. 6 illustrates cloud abstraction mode layers, according to embodiments of the present invention. In FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a fixture requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and determining an automatic action to be performed based on a first set of data and a second set of data.

In the context of the present application, where embodiments of the present invention constitute a method, it should be understood that such a method is a process for execution by a computer; i.e., is a computer-implementable method. The various steps of the method therefore reflect various parts of a computer program; e.g., various parts of one or more algorithms.

The present invention may be a system, a method, and/or a computer program product. The computer program product may include a computer readable storage medium (or media) having computer readable program instructions thereon for causing a processor o carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors of a computing system (or computer system) to implement the methods of the present invention.

A computing system (or computer system) of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for determining an action to be performed in response to an unsuccessful communication request, said method comprising:

obtaining, by one or more processors of a computing system from a first electronic communication device, a first set of data transmitted by the first electronic communication device to the computing system in response to a determination by the first electronic communication device that a called user of the first electronic communication device is unable or unwilling to accept a communication request from a calling user of a second electronic communication device, wherein the first set of data is associated with the called user, the first electronic communication device, the second electronic communication device, or combinations thereof, and wherein the first and second electronic communication devices are different electronic communication devices and are both external to the computing system;

obtaining, by the one or more processors from the second electronic communication device, a second set of data associated with the calling user, the second electronic communication device, or a combination thereof; and determining, by the one or more processors, the action to be performed based on the first set of data and the second set of data, wherein said determining the action is further based on environmental considerations, a time, weather conditions, traffic conditions, news information, pollution levels, hazard alerts, environmental warnings, pollen count levels, wind levels, public transport information, or combinations thereof.

2. The method of claim 1, said method further comprising:
passing, by the one or more processors to the second electronic communication device, the obtained first set of data.

3. The method of claim 1, said method further comprising:
passing, by the one or more processors to the second electronic communication device, an unsuccessful communication indication indicating that the communication request was unsuccessful, wherein the second set of data comprises response information input by the calling user into the second electronic communication device in response to the unsuccessful communication indication received by the second electronic communication device.

4. The method of claim 1, said method further comprising:
   determining, by the one or more processors based on the first set of data and the second set of data, an intended purpose of the communication request from the calling user, wherein said determining the action to be performed is based on the determined intended purpose.

5. The method of claim 1, wherein the action is executable in the first electronic communication device, the second electronic communication device, or a combination thereof.

6. The method of claim 1, wherein the first set of data comprises: calendar information of the called user, location information of the called user, location information of the first electronic communication device, a battery level of the first electronic communication device, a local time of the first electronic communication device, an active application of the first electronic communication device, a phone state of the first electronic communication device, scheduling information of the called user, weather in the vicinity of the called user or the first electronic communication device, traffic information in the vicinity of the called user or the first electronic communication device, a proximity of the called user to the calling user, contact information of the called user, contact information stored by the first electronic communication device, or combinations thereof.

7. The method of claim 1, wherein the second set of data comprises: calendar information of the calling user, location information of the calling user, location information of the second electronic communication device, a battery level of the second electronic communication device, a local time of the second electronic communication device, an active application of the second electronic communication device, scheduling information of the calling user, weather in the vicinity of the calling user or the second electronic communication device, a phone state of the second electronic communication device, traffic information in the vicinity of the calling user or the second electronic communication device, an intention of the calling user, a proximity of the calling user to the called user; contact information of the calling user, and contact information stored by the second electronic communication device, or combinations thereof.

8. A computer program product, comprising one or more computer readable hardware storage devices having computer readable program code stored therein, said program code containing instructions executable by one or more processors of a computing system to implement a method for determining an action to be performed in response to an unsuccessful communication request, said method comprising:
   obtaining, by the one or more processors from a first electronic communication device, a first set of data transmitted by the first electronic communication device to the computing system in response to a determination by the first electronic communication device that a called user of the first electronic communication device is unable or unwilling to accept a communication request from a calling user of a second electronic communication device, wherein the first set of data is associated with the called user, the first electronic communication device, the second electronic communication device, or combinations thereof, and wherein the first and second electronic communication devices are different electronic communication devices and are both external to the computing system;
   obtaining, by the one or more processors from the second electronic communication device, a second set of data associated with the calling user, the second electronic communication device, or a combination thereof; and
   determining, by the one or more processors, the action to be performed based on the first set of data and the second set of data, wherein said determining the action is further based on environmental considerations, a time, weather conditions, traffic conditions, news information, pollution levels, hazard alerts, environmental warnings, pollen count levels, wind levels, public transport information, or combinations thereof.

9. The computer program product of claim 8, said method further comprising:
   passing, by the one or more processors to the second electronic communication device, the obtained first set of data.

10. The computer program product of claim 8, said method further comprising:
    passing, by the one or more processors to the second electronic communication device, an unsuccessful communication indication indicating that the communication request was unsuccessful, wherein the second set of data comprises response information input by the calling user into the second electronic communication device in response to the unsuccessful communication indication received by the second electronic communication device.

11. The computer program product of claim 8, said method further comprising:
    determining, by the one or more processors based on the first set of data and the second set of data, an intended purpose of the communication request from the calling user, wherein said determining the action to be performed is based on the determined intended purpose.

12. The computer program product of claim 8, wherein the action is executable in the first electronic communication device, the second electronic communication device, or a combination thereof.

13. A computing system, comprising one or more processors, one or more memories, and one or more computer readable hardware storage devices, said one or more hardware storage device containing program code executable by the one or more processors via the one or more memories to implement a method for determining an action to be performed in response to an unsuccessful communication request, said method comprising:
    obtaining, by the one or more processors from a first electronic communication device, a first set of data transmitted by the first electronic communication device to the computing system in response to a determination by the first electronic communication device that a called user of the first electronic communication device is unable or unwilling to accept a communication request from a calling user of a second electronic communication device, wherein the first set of data is associated with the called user, the first electronic communication device, the second electronic communication device, or combinations thereof, and wherein the first and second electronic communication devices are different electronic communication devices and are both external to the computing system;
    obtaining, by the one or more processors from the second electronic communication device, a second set of data associated with the calling user, the second electronic communication device, or a combination thereof; and determining, by the one or more processors, the action to be performed based on the first set of data and the second set of data, wherein said determining the action is further based on environmental considerations, a time, weather conditions, traffic conditions, news information, pollution levels, hazard alerts, environmental warnings, pollen count levels, wind levels, public transport information, or combinations thereof.

14. The computer system of claim 13, said method further comprising:
passing, by the one or more processors to the second electronic communication device, the obtained first set of data.

15. The computer system of claim 13, said method further comprising:
passing, by the one or more processors to the second electronic communication device, an unsuccessful communication indication indicating that the communication request was unsuccessful, wherein the second set of data comprises response information input by the calling user into the second electronic communication device in response to the unsuccessful communication indication received by the second electronic communication device.

16. The computer system of claim 13, said method further comprising:
determining, by the one or more processors based on the first set of data and the second set of data, an intended purpose of the communication request from the calling user, wherein said determining the action to be performed is based on the determined intended purpose.

17. The computer system of claim 13, wherein the action is executable in the first electronic communication device, the second electronic communication device, or a combination thereof.

* * * * *